United States Patent

Davis et al.

[11] Patent Number: 5,216,220
[45] Date of Patent: Jun. 1, 1993

[54] WELDING OF COATED METALS

[75] Inventors: Michael P. Davis, Eindhoven, Netherlands; John M. Dowden, Colchester, England; Phiroze D. Kapadia, Colchester, England; Kenneth R. Rickwood, Colchester, England

[73] Assignee: British Technology Group Ltd., London, United Kingdom

[21] Appl. No.: 671,848
[22] PCT Filed: Oct. 13, 1989
[86] PCT No.: PCT/GB89/01215
  § 371 Date: Apr. 12, 1991
  § 102(e) Date: Apr. 12, 1991
[87] PCT Pub. No.: WO90/03865
  PCT Pub. Date: Apr. 19, 1990

[30] Foreign Application Priority Data

Oct. 15, 1988 [GB] United Kingdom .................. 8824213

[51] Int. Cl.$^5$ .............................................. B23K 26/00
[52] U.S. Cl. .................................................. 219/121.63
[58] Field of Search ........................ 219/121.63, 121.64

[56] References Cited

U.S. PATENT DOCUMENTS

| | | | |
|---|---|---|---|
| 3,604,890 | 9/1971 | Mullaney | 219/121.67 |
| 3,969,604 | 7/1976 | Baardsen | 219/121.85 |
| 4,642,446 | 2/1987 | Pennington | 219/121.64 |
| 4,682,002 | 7/1987 | Delle Piane et al. | 219/121.64 |
| 4,873,415 | 10/1989 | Johnson et al. | 219/121.64 |
| 4,945,202 | 7/1990 | Büdenbender | 219/121.63 |

FOREIGN PATENT DOCUMENTS 2561951 10/1985 France .

OTHER PUBLICATIONS

Patent Abstract of Japan, vol. 9, 279 (M-427) (2002) Nov. 7, 1985, & JP-A-60 121093 (Mitsubishi Jukogyo K.K.) Jun. 28, 1985.

Primary Examiner—C. L. Albritton
Attorney, Agent, or Firm—Cushman, Darby & Cushman

[57] ABSTRACT

A method and apparatus for welding together two metal workpieces, at least one of which has thereon a coating material which enters a fluid or visco-elastic phase at a temperature below the melting temperature of the workpieces, the method comprising the steps of subjecting the workpieces to a preliminary preparative treatment at a zone to be welded and thereafter applying (preferably be means of a high-energy beam such as a laser beam) sufficient heat to the workpieces at the weld zone to effect there the welding together thereof, wherein the preliminary preparative treatment comprises preheating the workpieces to the said lower temperature and pressing them together, at the zone to be welded with a force sufficiently great to expel coating material from between the workpieces at the weld zone. thereby to improve the quality of the subsequent weld.

16 Claims, 5 Drawing Sheets

Fig. 5
Fig. 6
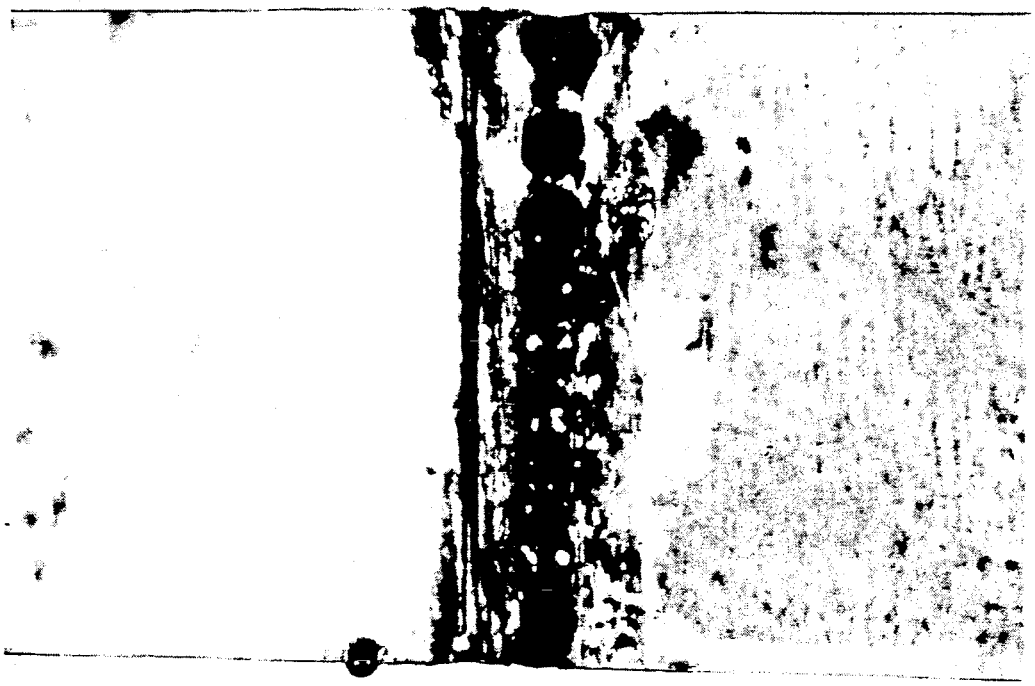

WELDING OF COATED METALS

This invention relates to methods of welding coated metals such as steel coated with zinc, and to apparatus for welding such coated metals. More particularly, but not exclusively, this invention relates to processes for welding galvanized sheet steel as an integral step in the manufacture of various products, such as automobile body shells.

The use of welding in a wide variety of manufacturing processes is very familiar in industry. Typical equipment for performing one such process comprises, in addition to the workpieces to e welded, a blow torch with a supply of gas that can be regulated to provide a controllable heat source and, for some kinds of welding, an appropriate welding flux. The difficulties of controlling accurately the heat source in this process together with the inconvenience of having to make use of a suitable flux produce considerable limitations on the quality and neatness of a resulting weld. For these reasons, conventional gas welding processes have been larely superseded in many instances by laser welding processes, usually employing $CO_2$ lasers which can serve as accurately focused and well controlled heat sources. Additionally, the use of a laser in a welding process enables the use of a welding flux to be dispensed with and this leads to very firm, sound and neat welds in the finished product. There are additional advantages in that smooth, efficient, accurate and swift processing can be achieved.

Steel sheets are often purchased as a processing material already coated with zinc to prevent corrosion. A basic difficulty arises when attempts are made to weld such galvanized steel sheets, especially when a laser welding process is to be employed.

Galvanized steel may be produced by one of the following methods: spraying a steel surface with molten zinc, electrolytic deposition of zinc on steel, heating steel in contact with zinc dust, and dipping steel into molten zinc. The zinc coated surface of the steel, when exposed to air, acquires a coherent inert oxide layer which prevents the steel from corroding. If the zinc layer on the surface of the steel if borken, some protection against corrosion is still obtained, as zinc is more electropositive than iron and the first stage of oxidation of zinc

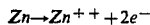

$$Zn \rightarrow Zn^{++} + 2e^-$$

occurs in preference to that of iron

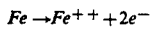

$$Fe \rightarrow Fe^{++} + 2e^-$$

It is for these reasons that galvanized steel is used extensively in industry. However, industrial production processes frequently require the lap welding of steel sheets, and, when galvanized steel sheets are used, the welding process has to cope with the layers of zinc between the steel substrates. Special difficulties arise with such sheets when welding by the use of a high-energy beam such as an electron beam or a laser beam. This is because zinc boils at a temperature of about 907° C., but steels melt at somewhat higher temperatures of about 1372° C., leading to explosive vaporization of the zinc layers sandwiched between the steel substrates of the sheets and consequent irregular distribution of (and loss of material from) the weld puddle of molten steel produced by the high-energy beam where it impinges on the sheets. The resulting weld is, in consequence, likely to suffer from voids and porosity and to be of poor quality.

One possibility for overcoming this problem is to machine the zinc coating off the steel sheet. This suffers from the disadvantages of being costly, time consuming and labour-intensive. Also there could be regions where the zinc coating is imperfectly removed by machining; inevitably problems would then be produced.

Another possibility is to follow the procedures suggested by the Ford Motor company in their U.S. Pat. No. 3,969,604. This describes a method of welding glavanized steel, using a high-energy welding beam, which attempts to prevent rapid vaporization of the zinc coating so as to avoid disrupting the weld puddle. In connection with the use of electron or laser beam welding with a power density of 6200 $W/mm^2$, the patent proposed painting the galvanized steel workpieces, in the area adjacent the weld zone, with a coating of a flux material such as iron oxide which, on heating, forms with the zinc coating a compound having a vapour pressure equal to or lower than that of the steel substrate. It is claimed that explosive vaporisation of the zinc and consequent disruption of the weld puddle are thus prevented, and that the problem of voids or porosity of the weld is thereby overcome.

This suggested process is, however, subject to drawbacks. One is that the use of an additional flux material has the effect of making the fine control of the process difficult, under industrial manufacturing conditions. By contrast, a purely physical procedure without essentially chemical involvement is more likely to be suitable for a manufacturing process.

It is a principal object of the present invention to provide a method of welding coated metals, such as zinc-coated (galvanized) steel sheets, and apparatus for welding such metals, which overcome the disadvantages as described above for the known procedures.

Accordingly, one aspect of the present invention provides a method of welding together two metal workpieces, at least one of which has thereon a coating material which enters a fluid or visco-elastic phase at a lower temperature than the melting temperature of the workpieces, the method comprising the steps of subjecting the workpieces to a preliminary preparative treatment at a zone to be welded and thereafter applying sufficient heat to the workpieces at the weld zone to effect there the welding together thereof, wherein the preliminary preparative treatment comprises preheating the workpieces to the said lower temperature and pressing them together, at the zone to be welded, with a force sufficiently great to expel coating material from between the workpieces at the weld zone.

In most instances, probably, the preheating will be carried to a temperature at which the coating material in the weld zone liquifies; but there are some potentially useful coating materials, such as some alloys of zinc, in which preheating to the fully molten liquid state is unnecessary because that state is preceded at a lower temperature by an acceptable "visco-elastic" state in which the material assumes a consistency resembling that of butter or putty which allows it to be expelled by the application of pressure from between two coated workpieces.

According to a further aspect of the invention there is provided welding apparatus for carrying out the method of the invention, such apparatus comprising pretreatment means, welding means, and means facilitating the transport of workpieces to be welded from the pretreatment means to the welding means, wherein the welding means comprises means for heating the workpieces to a welding temperature and the pretreatment means comprises means adapted to heat the workpieces to a lower temperature and means for pressing the workpieces together.

The preheating step in the method provided by the invention may be effected in various ways. Rollers or other means by which pressure is applied to the workpieces to expel coating material from between them may be made to serve as electrodes for passing a resistive-heating electric current through the workpieces to effect the preheating, or a high-energy beam such as a laser beam may be used, both for the preheating step and for the heating by which the actual welding is subsequently effected. In particular, if the further heating by means of which welding is effected is applied by means of a high-energy laser beam, the beam may be split into major and minor parts, with the minor part being diverted to effect the preheating and the major part, of greater power, being used to effect the weld at the weld zone.

It is within the scope of the invention to allow sufficient cooling of the workpieces to occur, between the preliminary pretreatment step and the actual welding step, that any unexpelled residue of the coating material within the zone to be welded, as well as adjacent unexpelled coating material which has been liquified or softened by the preliminary treatment, may return to its solid state and may, indeed, have the effect of soldering the workpieces together prior to being reheated during the actual welding step.

It will be understood that the welding process according to the invention lends itself to operation on a continuous basis, though it may also be performed on individual workpieces.

It will be appreciated that the welding process of this invention particularly lends itself to the lap welding of galvanised steel sheets. In such a case, the preheating should raise the sheet temperature to about the melting point of zinc, to ensure substantially all the zinc is squeezed out of the overlapping sheet regions to be welded together.

A laser, such as $CO_2$, laser may be considered a preferred means of providing the heating in the actual welding step, for such a heat source gives accurate, clean and controlled heating to effect welding of the workpieces. The apparatus most preferably includes pressure means, adapted to urge the two workpieces into engagement with one another immediately after the workpieces have been heated to the welding temperature, to ensure that a sound and homogenous weld is completed.

It will be appreciated that in performing the process of this invention, no additional flux material need be employed. The act of squeezing out the coating material (such as the zinc in the case of galvanised steel sheets) from the weld zone protects that weld zone during the subsequent welding step. In addition to lap seams, continuous butt welds may be formed by the process.

In order that the invention may better be understood, it will now be described in greater detail, reference being made to the accompanying drawings, in which:

FIGS. 5 and 6 are photographs of sample welds; and

Figure 1:
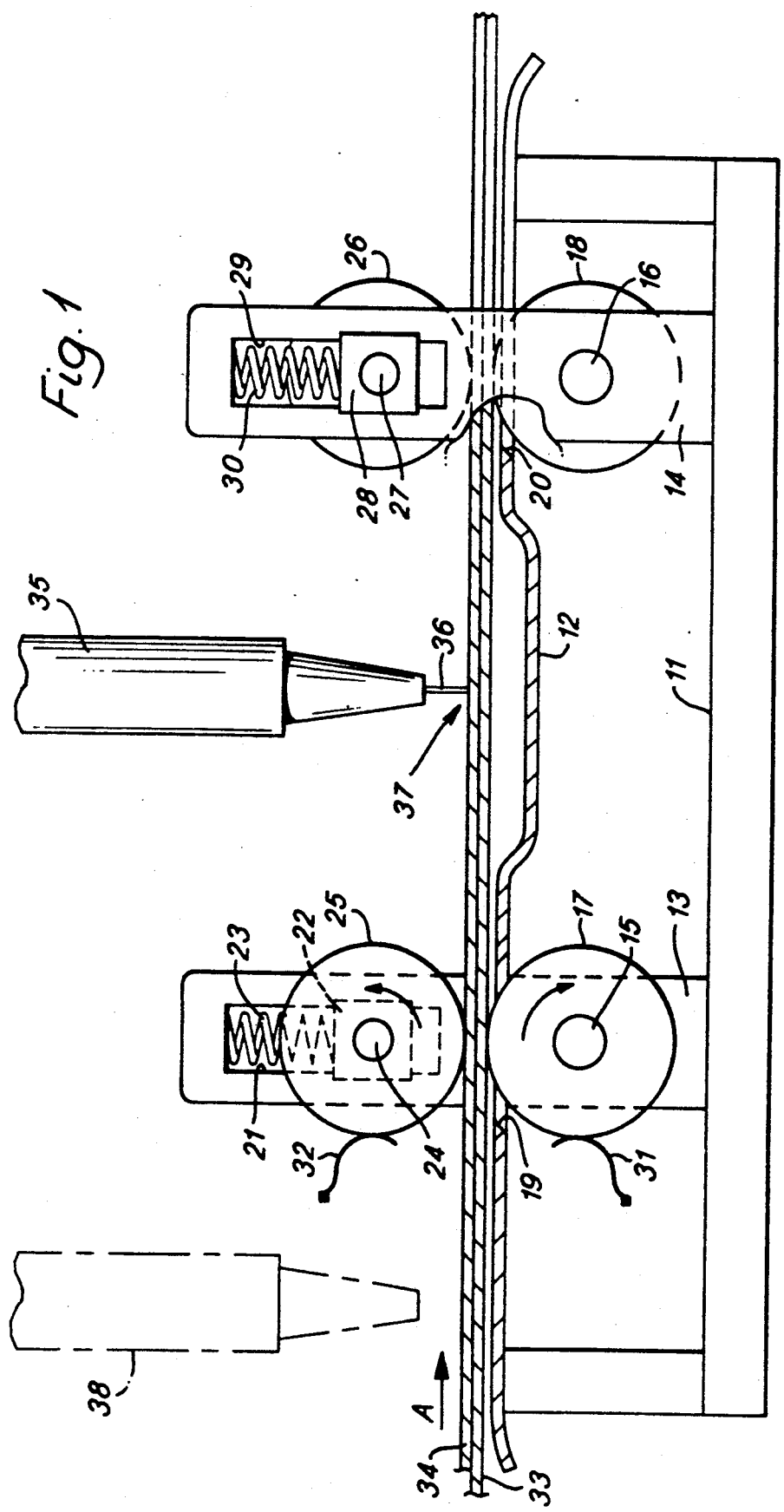
FIG. 1 is a diagrammatic view of a continuous lap welding apparatus of this invention.

The embodiment of apparatus of this invention for performing a welding process also of this invention and illustrated in FIG. 1 is intended to effect continuous lap welding on two zinc-coated (galvanized) steel workpieces. The apparatus includes a base 11 supporting a worktable 12 and upstanding arms 13 and 14 in which are journalled shafts 15 and 16 of two worktable rollers 17 and 18 which extend upwardly through respective slots 19 and 20 in the worktable so as to project slightly proud of its upper surface. The arms 13 are formed with slots 21 in which are vertically slidably mounted journal blocks 22 which are downwardly spring-urged by springs 23 and have journalled in them a shaft 24 of a pressure roller 25 which is thus spring-urged towards the roller 17 to define a pressure nip between those two rollers. A further pressure roller 26, similarly spring-urged towards the roller 18 and defining therewith a further pressure nip, is carried on a shaft 27 journalled in blocks 28 slidably mounted in slots 29 of the arms 14 and urged downwardly by springs 30. A suitable current source (not shown) is connected to the rollers 17 and 25 as indicated schematically by brushes 31 and 32, whereby an electric current may be passed through the superimposed workpieces, 33 and 34, as they are advanced together through the nip between rollers 17 and 25, in the direction of arrow A. A $CO_2$ laser 35 is positioned to direct a focused beam 36 on to a weld zone 37 of the workpieces as they progress between the rollers 17 and 18.

The apparatus is operated by first ensuring that the workpieces 33 and 34 travel smoothly over the guiding worktable 12 and worktable rollers 17 and 18 and through the pressure roller nips in a continuous way, at a suitable horizontal speed. The pressure of the upper roller 25 is adjusted, by means not shown, to a sufficiently high value. An appropriate current is selected, having regard to the horizontal travel speed of the workpieces, for passing through the workpieces at the nip between the rollers 17 and 25, to ensure a preheating of the workpieces sufficient to melt their zinc coatings. The welding laser 19 is meanwhile adjusted to be capable of performing a continuous welding process on the workpieces 33 and 34 at the weld zone 37.

On passing between the pair of rollers 17 and 25, the zinc on the workpieces is heated and squeezed out of that area, due to the pressure exerted by the rollers, to be reduced to a level where any remaining zinc will no longer present a problem in the laser welding process. The laser welding then proceeds in the usual manner, at the weld zone 37, and the welded workpieces are guided away through the nip between the rollers 18 and 26 which apply pressure to hold the sheets in their correct relationship as the weld between them solidifies.

It will be understood that the means by which the preheating is achieved is not a critical feature of the invention. For example, instead of using electrical resistive heating as described above with reference to FIG. 1, there could be provided in advance of the rollers 17 and 25, as shown in broken line, a further laser 38 of lower power than the laser 35 but sufficient, when incident on the sheet 34, to provide the required degree of pre-heating to melt the zinc coatings locally between the two sheets 33 and 34. In that case the rollers 17 and 25 do not provide the preheating, but only the pressure by which the molten zinc, along a line traced with respect to the sheets 33 and 34 as they pass under the laser 38, is squeezed out from between the sheets as the rollers press them together and slightly deform them towards and into contact with one another along that line.

Instead of providing a separate laser 38 for effecting the preheating, a practical alternative may be to split the output of the laser 35 by means not shown into a major beam which then serves as the welding beam 36 and a minor beam which is directed on to the sheet 34 ahead of the rollers 17 and 25 to effect the preheating.

It will be appreciated that the process described above in various modifications allows the rapid welding of galvanized steel sheets in a continuous manner. The preliminary pretreatment in accordance with the invention compares favourably with a mechanical machining process to remove zinc, which would be difficult to carry out continuously and to combine with a continuous welding operation, and which in any event would be time-consuming, liable to be erratic, labour-intensive and thus expensive. By contrast, the pretreatment step according to the invention is entirely based on physical processes which can be easily carried out in a smooth, controlled and accurate manner, and without the need for addition of any flux material. The process according to the invention is thus rapid, smooth, efficient and economical, compared to known processes for welding such sheets.

Figure 2:
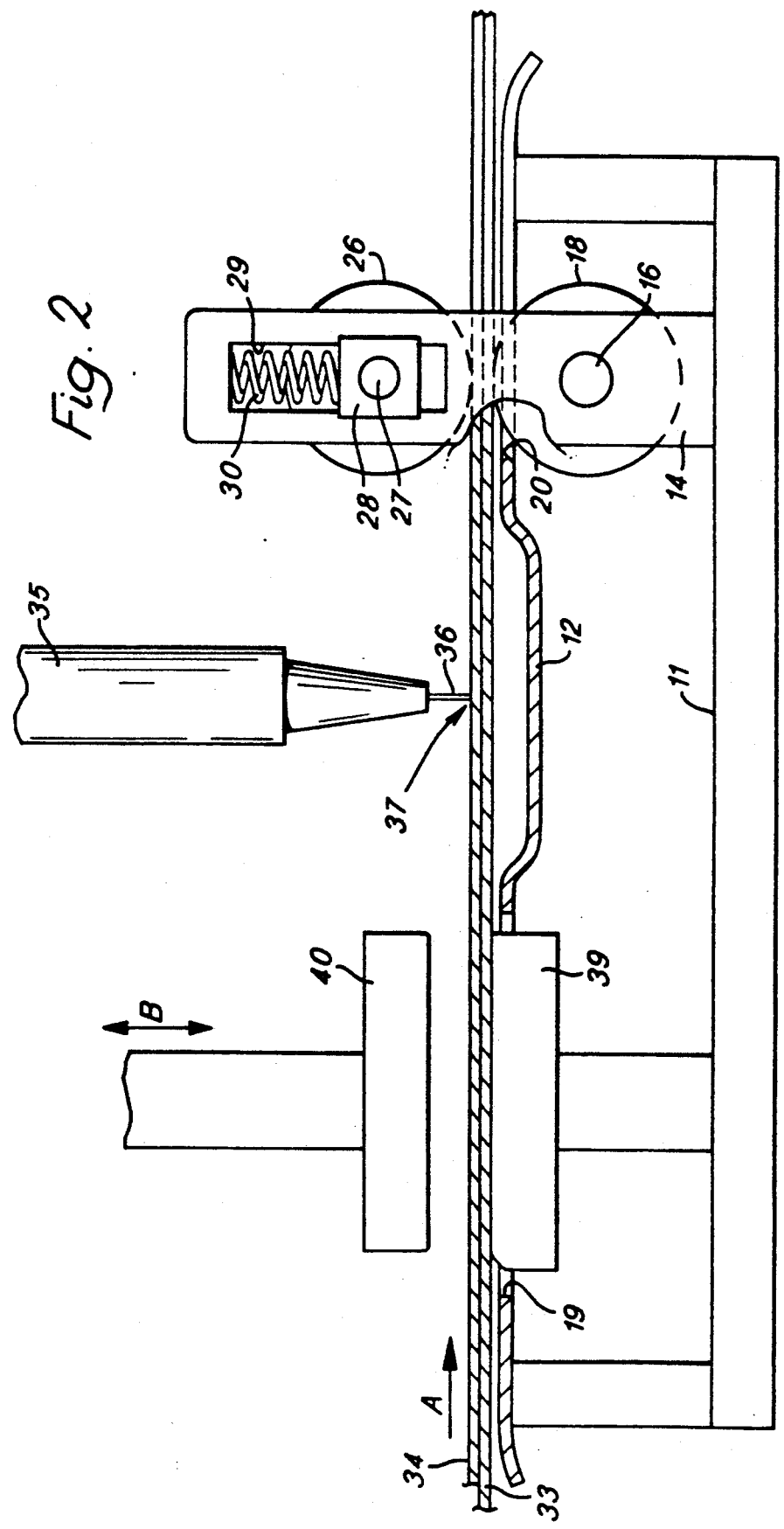
FIG. 2 is a similar view of a lap welding apparatus similar to that shown in FIG. 1 but incorporating some modification.

A further modification of apparatus for welding in accordance with the invention is illustrated in FIG. 2, in which the pair of rollers 17 and 25 is omitted and there are provided instead a fixed elongate electrode 39 which projects slightly through the slot 19 of the worktable 12 for sliding contact with the sheet 33 and a movable elongate electrode 40 which is reciprocable vertically, by means not shown but as indicated by the double-headed arrow B, into and out of a lower position in which the sheets 33 and 34 to be welded are clamped between it and the fixed electrode 39. Essentially the electrodes 39 and 40 resemble those of a spot welding machine and are controlled in a similar manner: while they clamp the sheets 33 and 34 between them a heating current source is connected to them to pass a heating current through the sheets 33 and 34. In this context, however, the heating current is chosen to be sufficient to melt the zinc coating of the sheets, locally between the electrodes, but insufficient to melt the steel of the sheets and thus weld them together. The sheets 33 and 34 in this instance are advanced step-wise, with alternating stationary periods and periods of workpiece advance. During each stationary period the sheets are gripped between the electrodes 39 and 40, the preheating current passes to melt the zinc coatings between the sheets and the molten zinc is expelled locally from between the sheets by the pressure exerted by the electrodes. At the end of each such stationary period, the preheating current is switched off, the electrode 40 is raised to release the sheets 33 and 34, and these are then advanced, in the direction of the arrow A, under the laser 35 to effect welding of the sheets.

Various weld patterns are possible. If the sheets 33 and 34 are advanced steadily under laser 35 while its beam 37 is switched on, a continuous weld of length up to that of the electrodes 39 and 40 may be made, and if the successive welds made in successive advance periods abut one another an effectively continuous weld of indefinite length is obtained. On the other hand, if the laser beam 36 is allowed to impinge on the workpieces during only a small part of each advance of the workpieces, or while they are stationary, then a pattern of spaced-apart spot-welds will result.

The process of the present invention will now be considered in greater detail. As disclosed above in relation to galvanised steel sheets, the process conduces to a satisfactory weld by preheating the region ahead of the weld zone to raise it to a temperature high enough to melt the zinc sandwiched between the layers of steel in a lap weld. whereby the heated molten zinc layer may be squeezed out of the region to be welded. The success of the method depends on the ability of the roller nip to impose sufficient pressure to reduce the amount of zinc trapped between the layers of steel to a level where any remaining zinc will not interfere with the welding process or the quality of the resulting weld. It may prove to be an advantage to use as large a keyhole radius as possible in the ensuing laser welding step, to ensure that any residual traces of zinc vapour are ventilated away, thus minimising difficulties in the weld process.

Figure 3:
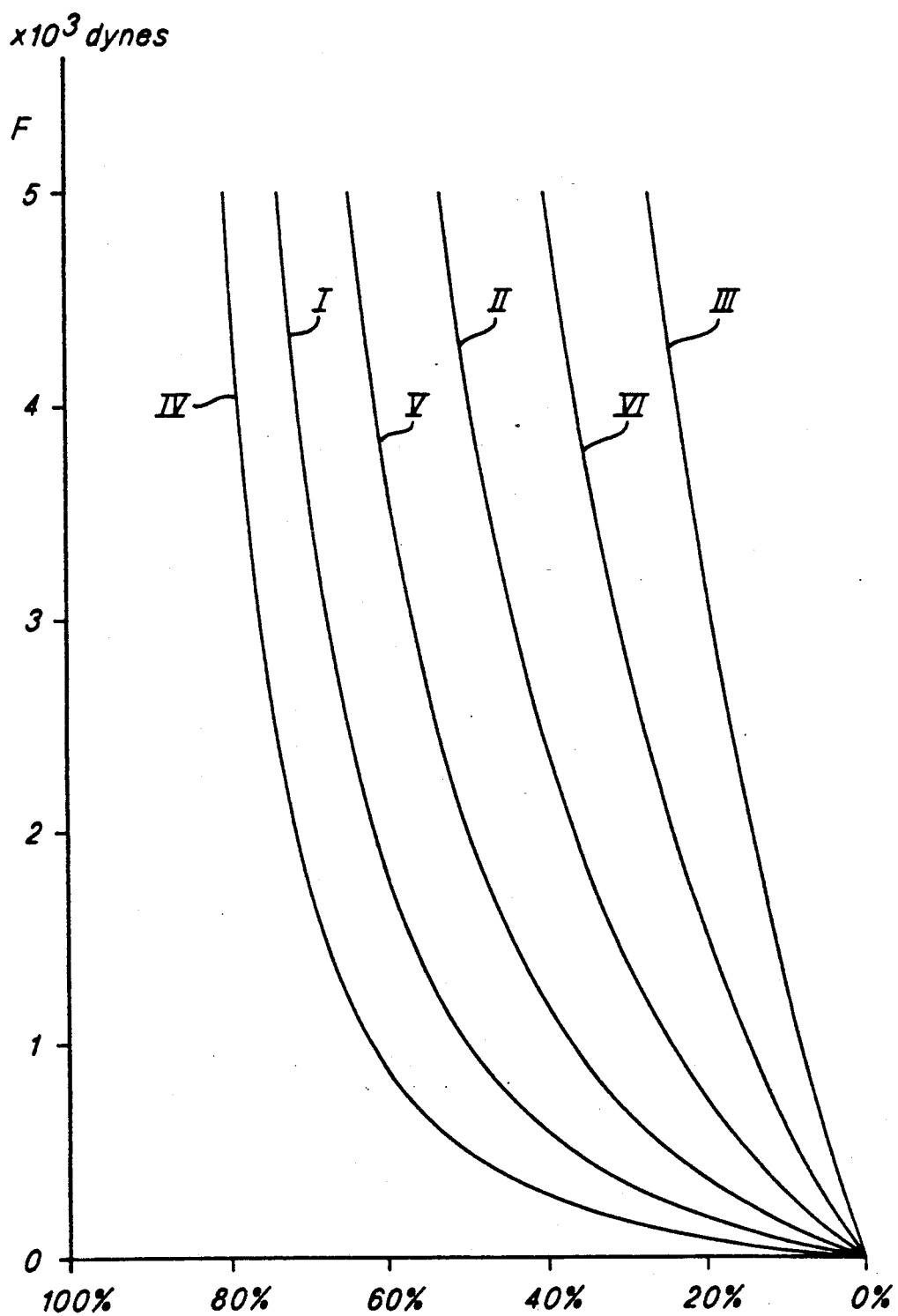
FIG. 3 is a plot of applied force against the percentage of zinc expected to be removed, when welding galvanized steel sheets by the method of the invention.

The degree to which zinc trapped between the two layers of steel can be expelled when molten by applying pressure depends on the thickness of the zinc layer, the degree of overlap of the sheets and the speed of traverse of the sheets. For a lap weld of 1 cm width and a traverse speed of 1 cm sec$^{-1}$, it may be calculated (assuming a preheating temperature high enough to melt the zinc and a trapped zinc thickness of 0.01 cm) that expulsion of 99% of the trapped zinc requires a pressure-roller force of the order of $10^6$ dynes whereas to remove 90% of the zinc requires only, approximately, $3 \times 10^4$ dynes. The calculated relationships between applied force F in dynes (up to $5 \times 10^3$ dynes) and the percentage of zinc expelled are shown in FIG. 3 (for a lap weld overlap of 1 cm) by curves I to VI for traverse speed U through the rollers and thickness H of the sandwiched zinc. as follows:

| Curve | U (cm sec$^{-1}$) | H (cm) |
|---|---|---|
| I | 1.0 | 0.02 |
| II | 1.0 | 0.01 |
| III | 1.0 | 0.005 |
| IV | 0.5 | 0.02 |
| V | 0.5 | 0.01 |
| VI | 0.5 | 0.005 |

Figure 4:
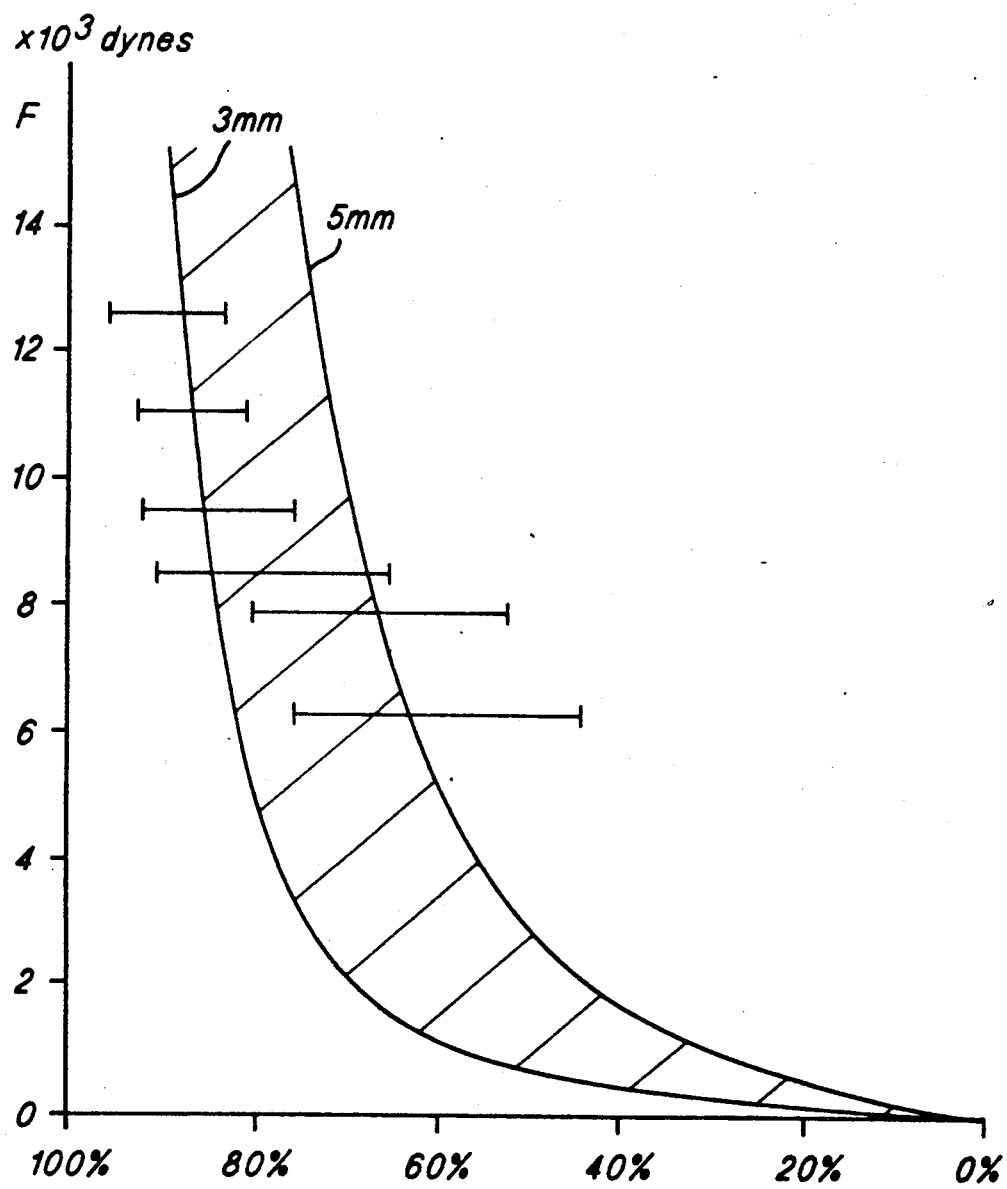
FIG. 4 shows corresponding plots relating to the results of certain experimental results obtained in relation to the method of this invention.

FIG. 4 shows corresponding calculated curves, for a traverse speed U equal to 1 cm sec$^{-1}$, in respect of lap weld overlaps of 3 mm and 5 mm respectively, and the hatched area between the two curves therefore represents the field in which experimental results would be expected to fall for a nominal lap weld overlap of 4 mm with a tolerance of ±1 mm. The horizontal bar plots of FIG. 4 represent the ranges of experimentally determined percentage expulsions of the zinc at various applied pressure forces when carrying out the preliminary preparative pre-heating and squeezing step according to the invention on numerous samples with such a lap weld width, of 4 mm ±1 mm. It will be seen that, although the correspondence is not exact, the practical results resemble the theoretical in at least a qualitative way.

Figure 7:
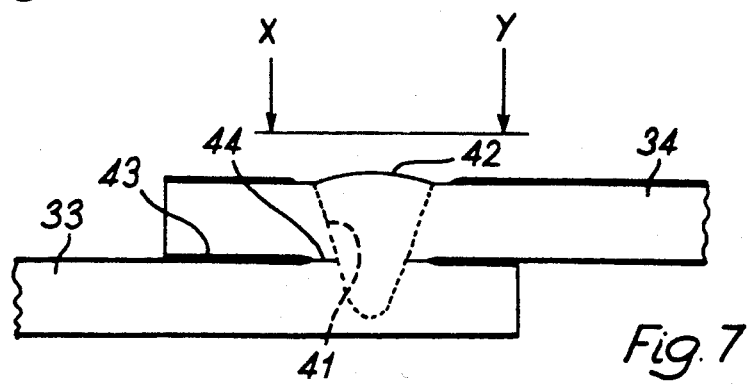
FIG. 7 is a diagrammatic cross-section through a weld completed in accordance with this invention.

FIG. 5 and 6 are photographic views of two welds of galvanised 1 mm-thick steel sheets, the weld of FIG. 5 having been made, in accordance with the invention, with heat and pressure pretreatment to expel sandwiched zinc from the weld zone as shown diagrammatically in the sketch sectional view of FIG. 7 (to which further reference is made below) and the weld of FIG. 6 having been made without pretreatment to remove zinc before making the weld. As shown in FIG. 7, upper and lower sheets 34 and 33 of galvanized steel have been laser-welded by exposing the upper sheet 34 to a laser beam of sufficient energy to melt the upper sheet locally through its whole thickness and to melt the lower sheet at least part-way through, to form a trough 41 filled with a molten-metal weld puddle which then solidifies on cooling to form a weld 42. The desired smooth and satisfactory formation of the weld 42 depends on the molten weld puddle having been allowed to form and then cool without disruption by explosive vaporisation of trapped zinc; and this is achieved, according to the invention, by the sheets 33 and 34 having been preheated and pressed together along their zone to be welded so that the surface coating of zinc 43 sandwiched between them at their overlap is made molten and squeezed out from the weld zone to provide a substantially zinc-free contact area 44 of the sheets at the weld zone. The typical resulting smooth weld 42 is shown in FIG. 5, which is a view of that region of the top sheet 34 in which the weld is formed and which in FIG. 7 extends between the arrows X and Y.

FIG. 6, on the other hand, shows a weld made without first carrying out the preliminary preparative treatment in accordance with the invention, so that the explosive vaporisation of unremoved sandwiched zinc, when it is abruptly subjected to severe heating by the welding laser beam as the beam penetrates to the interface between the two sheets, results in loss of weld material by splattering and, generally, in disruption of the weld puddle and prevention of the formation of a smooth weld. This results in the formation of a weld which is marred by porosity and by the presence of large scale voids which are seen as dark patches in FIG. 6.

We claim:

1. A method of welding together two overlapping metal workpieces, at least one of which has thereon a coating material which enters a fluid or visco-elastic phase at a temperature below the melting temperature of the workpieces, the method comprising the steps of subjecting the workpieces to a preliminary preparative treatment at a zone of their overlap to be welded and thereafter applying sufficient heat to the workpieces at the weld zone to effect there the welding together thereof, wherein the preliminary preparative treatment comprises preheating the workpieces at their overlap to the said lower temperature and pressing them together, at the zone to be welded, with a force sufficiently great to expel coating material from between the workpieces at the weld zone.

2. A method of welding as claimed in claim 1, wherein the preheating of the workpieces is carried to a temperature at which the coating material liquefies in the weld zone.

3. A method of welding as claimed in claim 1, wherein the heat applied to weld the workpieces is applied by subjecting at least one of the workpieces to a high-energy beam incident upon it at the said weld zone.

4. A method of welding as claimed in claim 3, wherein the said high-energy beam is a laser beam which causes localised fusion of the workpieces at the weld zone.

5. A method of welding as claimed in any of claims 1 to 4 wherein the preheating is effected by passing an electric preheating current through the workpieces between a pair of opposed electrodes and pressing together of the workpieces is effected by means of the electrodes.

6. A method of welding as claimed in claim 5, wherein the preheating is effected by passing the workpieces into the nip between a pair of pressure rollers and utilising the rollers as the said electrodes between which the said preheating current is passed through the workpieces.

7. A method of welding as claimed in any of claims 1 to 4, wherein the preheating is effected by directing the output of a preheating laser on to at least one of the workpieces at the said weld zone thereof.

8. A method of welding as claimed in claim 7, wherein the workpieces are pressed together, to expel coating material from between them, after the preheating has been effected.

9. A method of welding as claimed in claim 1, wherein a continuous weld is produced by carrying out the preliminary preparative treatment continuously and progressively over the workpieces to establish an elongate pretreated zone thereof, and applying the subsequent welding step progressively along that zone.

10. A method of welding as claimed in claim 1, wherein the preliminary preparative treatment is applied in a stepwise manner to provide a series of pretreated zones to be welded and the welding step is applied subsequently to each zone in sequence.

11. Welding apparatus welding together two metal workpieces, at least one of which has thereon a coating material which enters a fluid or visco-elastic phase at a temperature below the melting temperature of the workpieces, said apparatus comprising pretreatment means, welding means, and means facilitating the transport of workpieces to be welded from the pretreatment means to the welding means, wherein the welding means comprises means for heating the workpieces to a welding temperature and the pretreatment means comprises means adapted to heat the workpieces to a lower temperature and means for pressing the workpieces together.

12. Welding apparatus as claimed in claim 11, wherein the welding means comprises a laser arranged to direct a laser beam on to a workpiece to be welded.

13. Welding apparatus as claimed in claim 10 or claim 11, wherein the pretreatment means comprises a pair of rollers adapted to receive the workpieces in their nip.

14. Welding apparatus as claimed in claim 13 comprising an electrical current source connectable to the rollers to apply a resistive heating current via the rollers to the workpieces.

15. Welding apparatus as claimed in claim 10 or claim 11, wherein the pretreatment means comprises an electrical current source and, connectable thereto, a pair of electrodes movable relative to one another to grip the workpieces between them and to release them.

16. A welded product made by the method claimed in any of claims 1 to 4.

* * * * *